(12) United States Patent
Schmidt-Schäffer et al.

(10) Patent No.: US 8,560,287 B2
(45) Date of Patent: Oct. 15, 2013

(54) CONFIGURATION-CONTROLLED DYNAMIC GENERATION OF PRODUCT DATA FOR COMPLEX PRODUCTS

(75) Inventors: Tobias Schmidt-Schäffer, München (DE); Milton Amador, München (DE); Ulrich Seifert, Hamburg (DE); Ulf Schiller, Neu Wulmstorf (DE); Benjamin Becker, München (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 13/414,943

(22) Filed: Mar. 8, 2012

(65) Prior Publication Data
US 2012/0173210 A1 Jul. 5, 2012

Related U.S. Application Data

(63) Continuation of application No. PCT/EP2010/063112, filed on Sep. 7, 2010.
(60) Provisional application No. 61/240,776, filed on Sep. 9, 2009.

(30) Foreign Application Priority Data

Sep. 9, 2009 (DE) .................... 10 2009 040 731

(51) Int. Cl.
*G06F 9/455* (2006.01)
(52) U.S. Cl.
USPC ............................................................ 703/6
(58) Field of Classification Search
USPC .............. 703/1, 2, 6, 7; 705/7; 700/98; 244/118.6; 707/100, 102; 425/470
See application file for complete search history.

(56) References Cited

U.S. PATENT DOCUMENTS

| | | | |
|---|---|---|---|
| 5,106,290 A * | 4/1992 | Carver et al. | 425/470 |
| 2003/0033041 A1 * | 2/2003 | Richey | 700/98 |
| 2004/0153295 A1 * | 8/2004 | Lohmann et al. | 703/1 |
| 2005/0209830 A1 | 9/2005 | Lee et al. | |
| 2005/0240605 A1 * | 10/2005 | Knoblock et al. | 707/100 |
| 2006/0100829 A1 | 5/2006 | Lynch et al. | |

(Continued)

OTHER PUBLICATIONS

Wikipedia-Artikel: AutomationML, Aug. 16, 2009 <http://de.wikipedia.org/w/index.php?title=AutomationML&oldid=63442621> (machine generated English translation attached).

(Continued)

*Primary Examiner* — Kandasamy Thangavelu
(74) *Attorney, Agent, or Firm* — Lerner, David, Littenberg, Krumholz & Mentlik, LLP

(57) ABSTRACT

A method and a device for the computer-assisted generation of a construction plan for modular aircraft components on the basis of already validated partial module construction plans for the individual modules wherein at least one element is assigned to a respective partial module construction plan, and in this manner a hierarchy is defined that comprises a higher, module level and a lower, element level, with the method comprising: re-utilizing at least one of the already validated partial module construction plans; depending on user input, re-specifying at the element level one of the at least one element in one of the partial module construction plans to obtain an individualized partial module construction plan; validating, only at the module level, a combination of one of the partial module construction plans with the individualized partial module construction plan; and in the case of successful validation, composing the partial module construction plans of the combination validated in this manner, to obtain the construction plan.

14 Claims, 4 Drawing Sheets

(56) References Cited

U.S. PATENT DOCUMENTS

| | | | |
|---|---|---|---|
| 2008/0004843 A1 | 1/2008 | Pozuelo Cabrera | |
| 2008/0177593 A1* | 7/2008 | Clayton et al. | 705/7 |
| 2009/0030661 A1* | 1/2009 | Bouffiou et al. | 703/2 |
| 2009/0070368 A1* | 3/2009 | Callahan | 707/102 |
| 2009/0084897 A1* | 4/2009 | Ferry et al. | 244/118.6 |
| 2009/0164490 A1* | 6/2009 | Wininger et al. | 707/100 |

OTHER PUBLICATIONS

Sohrt W et al: "Interaction with constraints in 3D modeling", Proceedings. Symposium on solid modeling foundations and CAD / CAM Applications, XX, XX, Jun. 5, 1991, Seiten 387-396, XP002231158, D0I: D0I:10.1145/112515.112570 *Zusammenfassung Seite 395, Spalte 2, Absatz 1-5; Abbildung 19.

* cited by examiner

CONFIGURATION-CONTROLLED DYNAMIC GENERATION OF PRODUCT DATA FOR COMPLEX PRODUCTS

CROSS-REFERENCE TO RELATED APPLICATIONS

This application is a continuation of International Application No. PCT/EP2010/063112, filed Sep. 7, 2010, which claims the benefit of the filing date of U.S. Provisional Patent Application No. 61/240,776, filed Sep. 9, 2009, and of German Patent Application No. 10 2009 040 731.6, filed Sep. 9, 2009, the disclosures of which applications are hereby incorporated herein by reference.

TECHNICAL FIELD OF THE INVENTION

The invention relates to a method and a device for the computer-assisted generation of a construction plan or design documentation for modular aircraft components.

BACKGROUND

Passenger aircraft supplied by aircraft manufacturers to aircraft operators are complex technical systems.

A passenger aircraft comprises a large number of components. Many of these components can be, and are, ordered by the respective aircraft operators in a particular form, modification or configuration, i.e. they reflect customer wishes.

Apart from specific wishes relating to the interior outfit of the aircraft, each aircraft operator has specifications that are prescribed by the respective national aeronautical authorities.

Providing the respective variously configured components for final assembly takes place within the framework of so-called realization engineering. In the course of this the various configurations or specifications demanded by the aircraft operator are registered.

On the basis of this registered specification material, construction documentation is generated, for example construction plans and other documentation. As a result of the immense combination options this pre-engineering step is time-consuming and expensive. There is thus a requirement in the aircraft industry to render development more efficient by targeted module-oriented pre-engineering of suitable sub-assemblies for the aircraft.

SUMMARY OF THE INVENTION

The present invention addresses this requirement in the aviation industry by providing a method and a device for the automated or computer-assisted generation of construction plans for modular aircraft components.

The method is based on already validated partial construction plans for the individual modules, wherein elements are assigned to the respective modules. By means of this module/element structure a hierarchy is defined that comprises at least two levels: a module level and an element level. The method then comprises the following steps: in a responsive manner or as a reaction to a user input, at the element level at least one of the elements is re-specified or modified in one of the (partial) module construction plans in order to in this manner obtain at least one individualized partial module construction plan. Thus several options can be offered. They subsequently limit the module parameters that can be affected at all, thus to some extent also limiting the solution space.

Subsequently, exclusively on the module level, validation of the combination of one or several of the partial module plans with the module individualized in this manner takes place. In the case of successful validation, a composition of the partial module construction plans of the combination validated in this manner then takes place in order to in this manner obtain a validated construction plan, or in order to simplify the validation of said construction plan.

In this document the term "validated" means, in particular, that the respective modification, or the composed construction plan ("the combination") in its entirety complies with the rules prescribed by the aviation authorities, and moreover also meets the technical requirements (construction and production) of the manufacturer.

The partial construction plans or the validated final construction plan are preferably present in electronic form, for example as a structured Extensible Markup Language ("XML") document.

The aircraft component can, for example, be a cabin of a passenger aircraft. The individual modules are, for example, seat group units in particular zones of a passenger aircraft. The seat group units in turn are constructed from elements, for example seat rows. In this arrangement each seat row comprises a specified number of seats. However, the elements can also be toilet monuments or galley monuments, seats for flight attendants, emergency equipment or other configurable cabin installations.

According to a further aspect of the invention, one or several of the individual elements within the already validated partial construction plans are linked either among themselves or to elements in other already validated partial construction plans. This link can also extend to module characteristics at module level of the partial module construction plans. As a result of modification of the element, subsequently also a dynamic-automatic (co-)modification of the other elements or module characteristics linked to this element takes place. In this process, setting these links takes place in a rule-based manner and is also based on considerations that are necessary from the point of view of construction-technology or on specifications of national aviation authorities.

For example, setting a toilet monument to a particular position within the module means that at this position no window is necessary. As a result of the link with this modification of "setting a monument to position X", at the module level the module characteristic in the respective partial module construction plan will not be set at position X.

Overall, the method makes it possible to more quickly generate construction documentation for the final assembly of the passenger aircraft ordered.

The configuration process and thus the delivery of the aircraft is accelerated while the costs remain the same or are lower. In this way it is possible to avoid "ad hoc" implementations of constructional changes in the passenger aircraft to be delivered.

Furthermore, by (re-)using already validated modules, a validation step can be carried out more quickly because it is not necessary to "validate down" to the element level.

As a result of this the computational effort is considerably reduced, and computer-assisted implementation of the method, for example in a web-based system with client-server architecture, can in this manner be implemented with acceptable reaction times.

The invention also provides a corresponding device for the computer-assisted generation of the construction plan for modular aircraft components. Furthermore, the invention provides a program element or an electronic data carrier for the computer-based executability of the method.

The method according to the invention and the device according to the invention thus make possible the configuration controlled dynamic generation of product data or construction documentation for aircraft components that are configured in a customer-specific manner, based on a modular product structure.

Definitions

Validation/validated: a partial construction plan is valid ("validated") when the aircraft component specified therein meets the technical requirements relating to construction and also complies with the specifications ("rules") of the aviation authorities. The process of checking whether the partial construction plan satisfies these requirements and rules is known as "validating". If the result of such checking is in the affirmative, then validation has been successful. If not, then a warning message is transmitted to the user, for example in the form of a pop-up window on a display, or the program does not allow such configuration and guides the customer to a similar, constructable, solution. The user should then revise the input so that renewed validation can be started.

However, it is also possible for the invalid selection options to be precluded a priori by being grayed out, and, if applicable, if selection is attempted, detailed reasons relating to the rule infringement to be provided. In this manner the user is given an understanding of the problem and can possibly modify the product at some other location so that the option then becomes allowable.

Levels/hierarchies: the already validated partial module construction plans are stored as electronic data structures on databases, wherein the data structures are suitable for depicting the hierarchy comprising two or more levels. The higher module level only relates to specifications or (module) characteristics, in other words technical parameters, which relate to the module itself as an independent component. Thus the module characteristics define "global" features of the module. This also includes relationships between the elements of the module. In contrast to this, "local" features of the element itself become modifiable or specifiable on the lower element level. Example: where there is precisely one seat in a module seat group unit, is a global feature determined by the corresponding module characteristic. In contrast to this, the color of the seat cover is a local feature of the element "seat", which feature is determined by the corresponding element characteristic. Modification at the (lower) element level means a change of an element characteristic. Modification at the (higher) element level means a change of a module characteristic. A modified element or module is deemed to be individualized. It should be noted that rule changes at the local "element" level do not have an effect on the module level, should this be undesirable.

Construction plan: comprises product data and also other documentation that are used for final assembly of the aircraft or aircraft component individualized according to customer wishes.

Data structures: data structures that can be nested or that are tree-like are eminently suitable for depicting this hierarchy of levels. The lower a level, the more deeply nested is the corresponding descriptive data (element characteristic or module characteristic).

Apart from XML files, other data structures, e.g. the associative arrays known from the programming language "Pert", i.e. arrays relating to "key/value" pairs, are also suitable. Apart from XML files, relational databases can also be used.

BRIEF DESCRIPTION OF THE DRAWINGS

The figures are not to scale; they merely show one exemplary embodiment of the invention. In the figures identical reference characters relate to the same features.

DETAILED DESCRIPTION OF EXEMPLARY EMBODIMENTS

Figure 1:
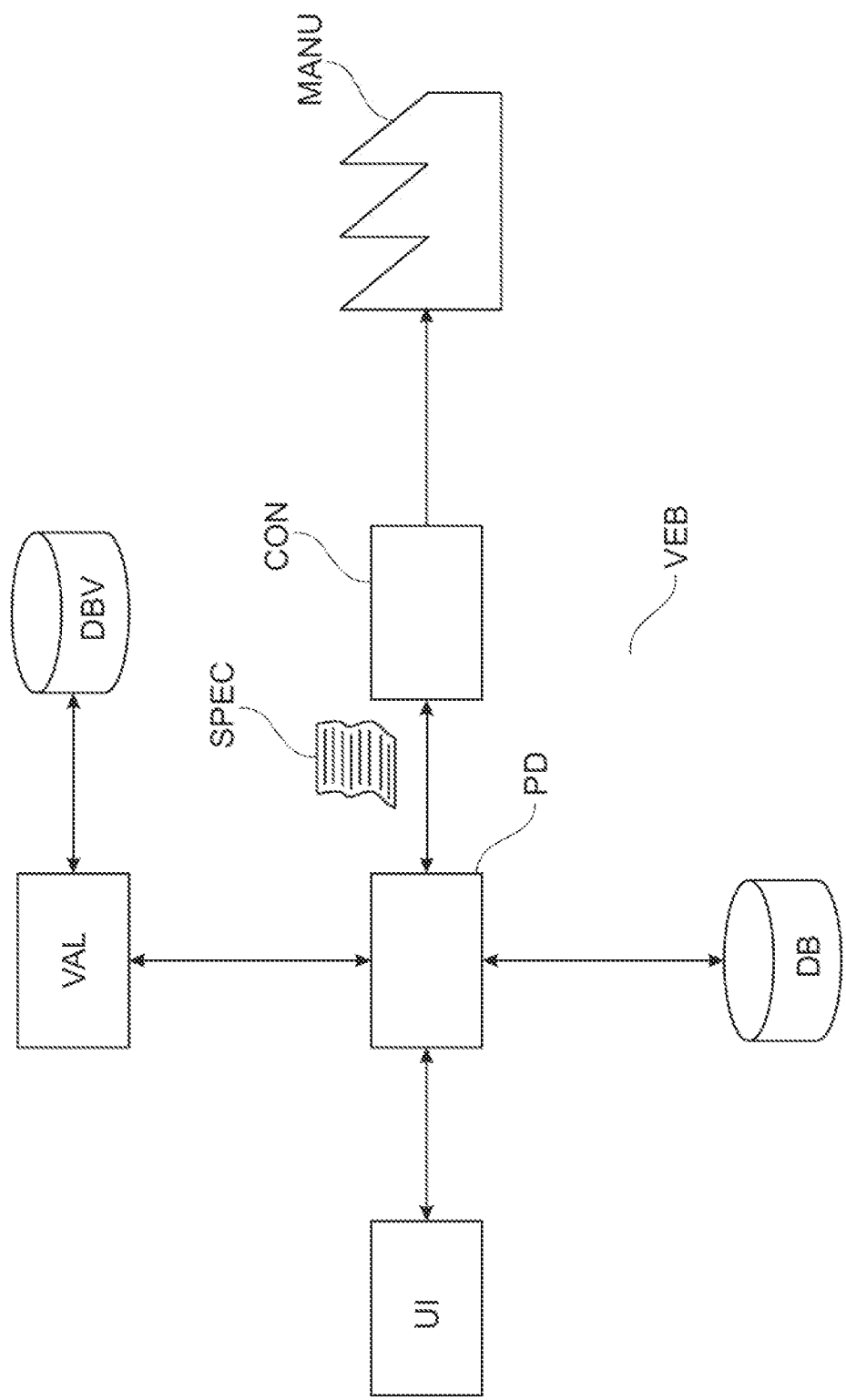
FIG. 1 shows a diagrammatic block diagram of a production plant or manufacturing plant with a device for the computer-based preparation of construction plans according to an exemplary embodiment of the invention.

FIG. 1 shows a diagrammatic block diagram of a device VEB for the automatic generation of construction plans for modular aircraft components. A module is, for example, a number of passenger seat groups within a zone in a passenger aircraft cabin. A module comprises several elements, e.g. the individual seat rows. Other examples of elements of the cabin zones include galley monuments or toilet monuments.

The device VEB comprises a computer PD that is controlled by an engineer or user by way of a user interface UI. In this arrangement the user interface UI can be a graphic user interface (GUI) in which control takes place by way of a menu structure that is known per se.

By way of the user interface UI the user enters their desired selection. The options for the element are automatically placed by the system, and the dimensioning/positioning is specified by the module in an invariant manner.

Technical parameters for galley monuments or toilet monuments, as used in passenger cabins, include, for example, the water pressure, required by the user, in the pipe work, or the specification of electrical cabling with regard to the wattage of electrical kitchen devices in the galley monuments. However, as a rule it is not these parameters that are configured; instead, the options of the element and the "parameters" are then derived from the configuration. The rules correspondingly ensure that these parameters are within a valid range (constructability, . . . ).

A number of already validated partial construction plans, from which the subsequent construction plan SPEC will be combined, are ready on a database system DB. By means of module characteristics the partial construction plans specify the respective modules at a higher module level.

The parameters are, for example, entered in a template that in this way is completed to form the finished and valid construction documentation. For example, some automated information is also added: user-specified options, date and airline are derived from other databases; together this is construction documentation for a particular Manufacturer's Serial Number ("MSN").

At a lower element level by means of element characteristics the elements are specified that are arranged in the modules. Thus a two-level hierarchy of levels is defined. The partial construction plans and the construction plan SPEC to be generated can, for example, have been or be implemented as structured XML files. By means of the XML data structure, this hierarchy, which comprises at least two levels, can be depicted by corresponding nesting of the known XML tags <,>.

A validation unit VAL is communicatively connected to the computer PD and to a rules database DBV.

In the rules database DBV, rules that are prescribed by the aviation authorities are stored, for example in tabular data structures. The tabular data structure comprises, for example, at least two columns.

Apart from these rules, which are in particular connected to the "options" (not described in detail in this document), global rules are also taken into account. There are product-specific rules which define the performance of the product and thus ensure "constructability". For example, the overall power consumption of the cabin is not administered by means of local restrictions. Apart from that there may also be rules as to which aircraft model and to which zone a module is to be assigned.

In a column, identifiers relating to the respective modifiable elements of the partial construction plans are stored. In the associated line in the second column the respective specification value is stated, for example as a code, numerical value or as a numerical range. For example, a color relating to a seat cover of a seat can be encoded.

On the basis of the technical parameters that are derived from the options, modification of the corresponding characteristics of the already pre-validated partial construction plans takes place. This takes place by writing the parameter into the corresponding element or module characteristic at the corresponding position in the XML-coded partial construction plan.

According to a further aspect, one or several of the individual elements within the already validated partial construction plans are either linked among each other, or are linked to elements in other already validated partial construction plans. This link can extend to module characteristics in the module level of the partial module construction plans. By modification of the element, subsequently a dynamic-automatic (co-) modification of the other elements or module characteristics linked to this element also takes place. Setting these links takes place in a rule-based manner and is also based on considerations that are necessary from the point of view of construction-technology or on specifications of national aviation authorities.

The partial construction plans are then combined by the computer PD. Combining can, for example, take place in that the individual XML files are merged to form an overall XML file, or in that the partial constructions plans to be combined are interconnected by way of links.

However, the actual combining of the partial constructions plans takes place only if the validation unit VAL does not register any infringement of the rules stored in the regulation database DBV.

The validation unit VAL can, for example, be designed as a parser that goes through the respective entries in the partial construction plans and compares the parameters entered therein as a new element characteristic or module characteristic with the values contained in the second column of the table in the rules database DBV. If a match is registered in relation to each characteristic, in other words if the value entered by the user matches the value in the second column of the table, the combination is deemed to have been validated. As a result of linking, a modification at the module level can also result in the validation not being successful. In the case of lack of success a signal is transmitted from the validation unit VAL to the computer PD. The computer PD will then transmit a warning signal to the user and will wait for an input of revised parameters.

The final construction plan SPEC obtained in this way can then, for example, be fed to a suitable backend for further processing. For example, the final construction plan SPEC can be forwarded to a computer aided design (CAD) system in order to generate a graphic overall plan. This plan can then, for example, be counter-checked by an engineer.

As an alternative or in addition, the final construction plan SPEC can also be fed to a control device or interface CON so that by way of this control device CON a manufacturing plant MANU can be supplied with those components that were specified in the final construction plan SPEC.

Furthermore, it is possible, for example, to control industrial production robots or low-floor vehicles in warehouses in order to provide the components specified in the final construction plan SPEC with the respective dimensions or in the respective forms, or to supply the aforesaid at a predetermined destination for final assembly.

In the following FIGS. 2 and 3, for the sake of simplicity of presentation, the same reference characters are used for the modules and elements or their specification as partial module plans.

Figure 2:
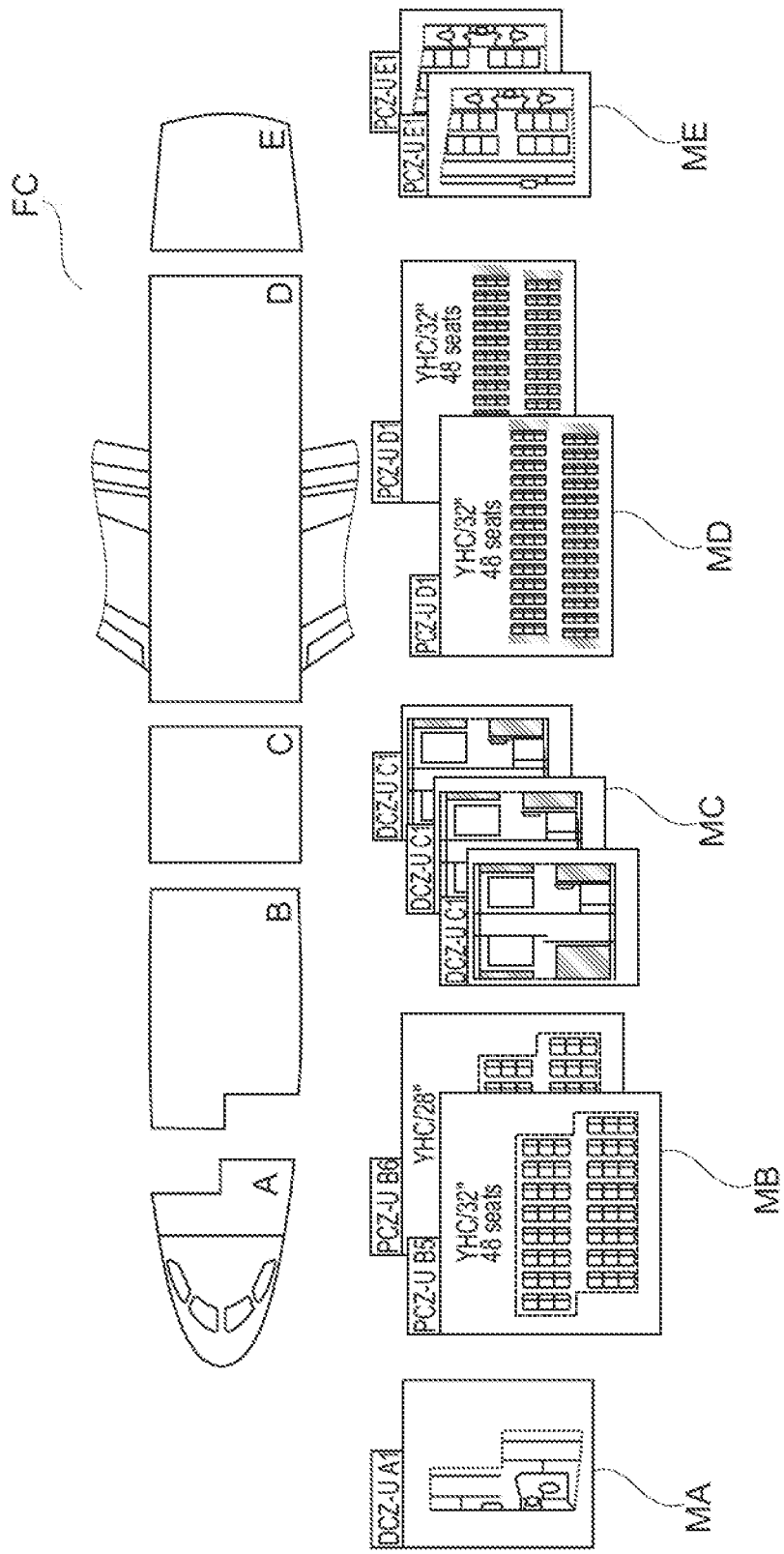
FIG. 2 shows an aircraft cabin of a modular design.

FIG. 2 shows an overview of a modular aircraft component. The aircraft component is an aircraft cabin FC. FC comprises a horizontal projection composed of various zones A-E. In this example the zones differ in that doors are arranged in zones A, C, E, but no doors in zones B, D. In each case various seat group modules MB, MD can be assigned to the respective zones B, D without doors. Supply regions MC, for example toilet monuments or galley monuments, are ready as further modules. In this arrangement the special seat group modules MA, ME are provided for the cockpit or for the tail region of the aircraft E.

Figure 3:
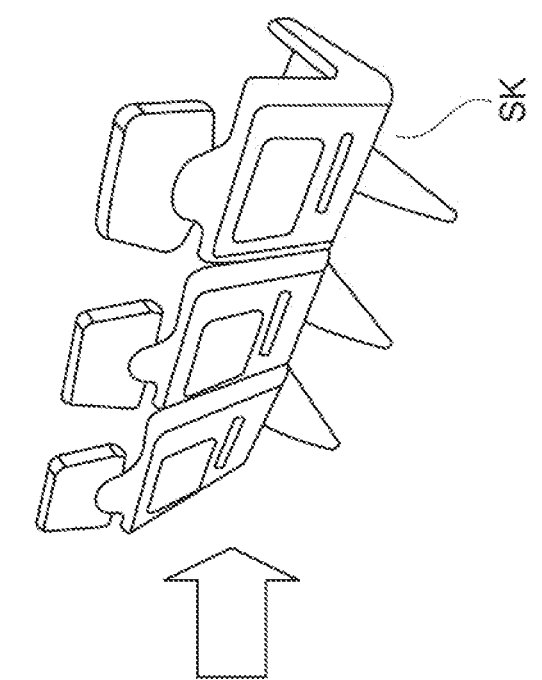
FIG. 3 shows a seat row element from one of the seat group modules in FIG. 2.
Figure 3:
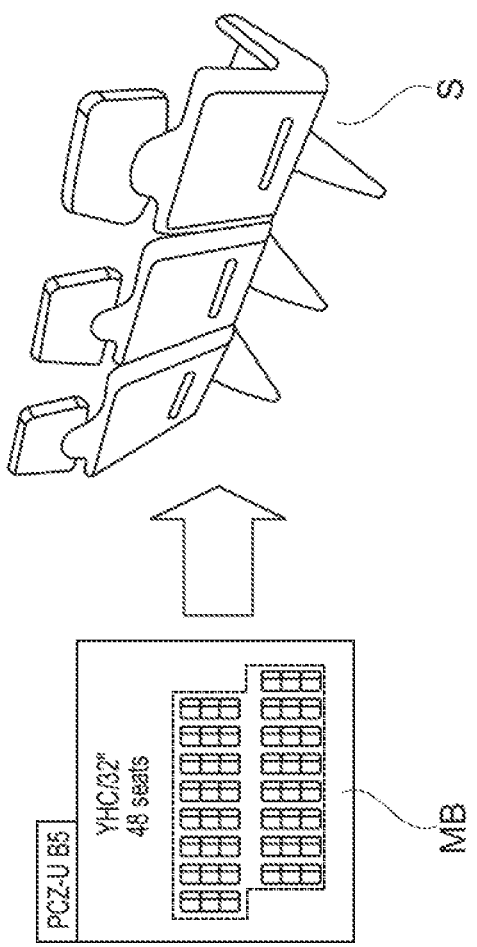

In this arrangement cabin elements, for example individual seat rows E, can be assigned to each seat group module MA, MB, MD and ME, as shown in FIG. 3.

Based on the user input provided by way of the user interface UI, each cabin element "seat row S" can be modified, in other words can be specified by a particular form. For example, the form "with monitor" would result in a modified or individualized seat row SK in which the backrests comprise monitors. In FIG. 3, for the sake of clarity, as an example only, one illustration of the partial construction plan of the seat group module MB with the associated cabin element S is shown. The same applies analogously to the other cabin modules MA, MC— ME.

In order to save computing time during validation by the validation unit VAL, validation does not take place down to the element level. This is possible in that the partial construction plans in the database DB are already pre-validated. In this arrangement pre-validation is selected in such a manner that the selection of a particular form for a particular cabin element in a seat group module does not require renewed validation in DBV. For example, seat row E in FIG. 3 has been installed in the module MB so as to comply with the rules in order to be valid, or the comprehensive module MB is valid even if the cabin element E was equipped with a monitor/was modified to become a modified cabin element.

XML coding of the partial module construction plan MB can, for example, be as follows:

```
<module MB: module characteristic MB_1=mb_1, ...>
    <element S: element characteristic S_1=s_1, ...>
    >
    ...
>
```

A flag in the element characteristic "with monitor?" (S_1) has in the present example then been modified or set to "yes" (s_1).

According to an expanded embodiment the validation device VEB can be set or programmed in relation to the level depth to which validation is to take place. In the present example with the two levels element level or module level, validation only takes place at the module level. However, a validation strategy comprising finer granularity is imaginable in that, for example, the cabin elements E are composed of sub-elements corresponding to the respective individual seats. In this case there would then be three levels. The device VEB is then designed in such a manner that it is possible to set whether validation is to take place only at the first/highest level (module level) or also at the second level (element level) or also at the third level (sub-element level).

If validation takes place not only at the first level but also at the second or third level, the device VEB allows greater flexibility, which would, however, then be obtained at the expense of more intensive computing time of the validation unit VAL.

Thus the device VEB can be optimally matched to the requirements of the computing capacity and required flexibility.

The validation unit VAL, the computer PD, and the database systems DB, DBV or the user interface UI can in each case be designed as individual hardware modules or software modules.

According to an embodiment, implementation takes place on a single local computer.

According to one embodiment, a client-server structure for a web-based embodiment of the validation device VEB is provided. In this case the provision of the technical specification data takes place by way of the customer (for example the airline wishing to order an aircraft) from a client on which the user interface UI is displayed. By way of a network connection, for example the internet, data exchange with the computer PD (server) then takes place. PD in turn is in communication, by way of the network, with the database systems DVB or DB. If the finished construction plan SPEC has been validated and combined, it can then be sent, by way of the network connection, to the control unit CON in order to coordinate the further final assembly at the plant MANU.

Figure 4:
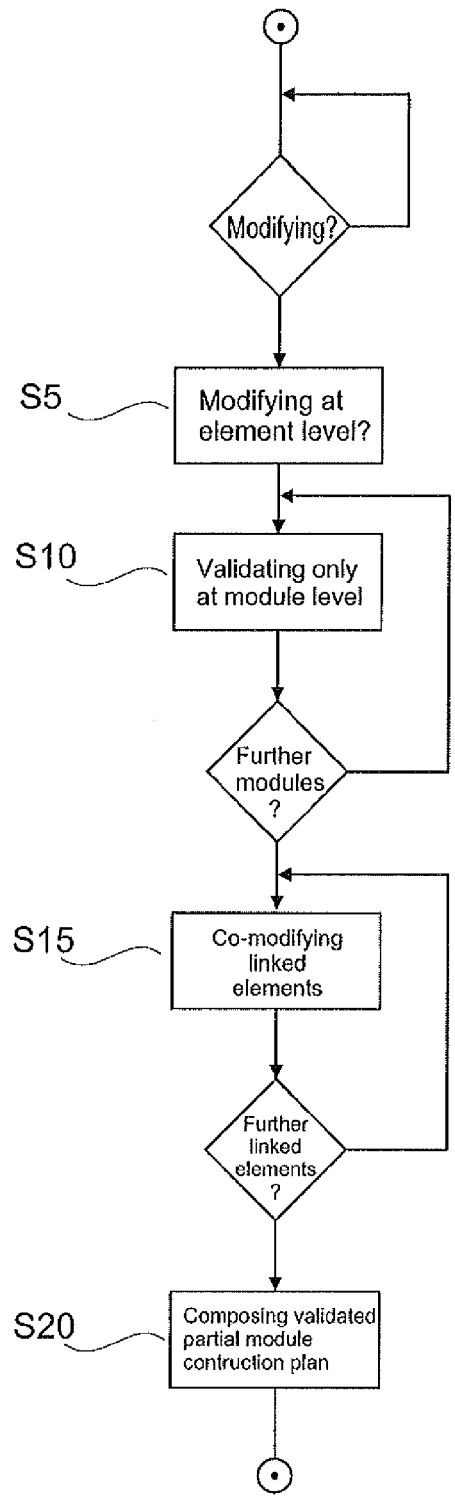
FIG. 4 shows a diagrammatic flow chart of the method for the automatic generation of the construction plan for modular aircraft components according to an embodiment of the invention.

For elucidation, FIG. 4 shows a flow chart of the method which provides the basis for the device VEB for the computer-assisted generation of the construction plan SPEC.

In a first step S5, optional modification at the element level takes place. In this process at least one of the elements E is converted to a modified element so that in this manner an individualized seat group model, in other words a seat group model that is specially tailored to the requirements of the user, is obtained from the already pre-validated module MB. The same applies analogously to the other modules MA, MC-ME.

Subsequently in step S10 validation takes place that adjustably takes place only at the module level. In this process the combination of one or several of the modules MA, MC-ME with the individualized module is validated.

An optional step S15 builds on a link of the individual elements S within the same module or with other elements in other modules MA, MC-ME. If in the preceding step S10 modification of the element S has taken place, then automatically a rule-based corresponding modification of the linked elements takes place, either in the same module or in the respective other modules MA, MC-ME. These rules are also based on the rules of the rules database DBV. This dynamic co-modifying can, for example, be logically necessary or it can be due to construction-related reasons. As a result of this dynamic co-modification, a user input is no longer required at this stage in the workflow. Otherwise the user would each time have to "manually follow up" and adjust the characteristics in the other partial construction plans. Consequently the data exchange and thus the utilization of the network can be minimized.

If validation has been successful, the validated partial module construction plans are composed in step S20 so that in this way a validated final construction plan SPEC is obtained.

Subsequently the database DB can then be updated in that the validated construction plan SPEC is saved together with the ID of the customer. By means of an iterative application of the method described above it is then possible, starting from the valid construction plan SPEC as a new "partial construction plan", to gradually generate a complete construction plan for the entire aircraft in a computer-assisted manner with the device VEB.

It should be noted that the terms "comprising" and "exhibiting" do not rule out other elements or steps and that "a" or "an" do not rule out a plurality. It should further be noted that features or steps which have been described with reference to one of the above exemplary embodiments may also be used in combination with other features of steps of other above described exemplary embodiments. Reference numerals in the claims are not to be construed as limitation.

The invention claimed is:

1. A computer-assisted method for generating a construction plan for a modular aircraft component from a plurality of individual modules on the basis of already validated partial module construction plans for the individual modules, wherein at least one element is assigned to a respective partial module construction plan, and in this manner a hierarchy is defined that comprises a higher, module level and a lower, element level, with the method comprising:
    re-utilizing at least one of the already validated partial module construction plans;
    depending on user input, re-specifying at the element level one of the at least one element in one of the partial module construction plans to obtain an individualized partial module construction plan;
    validating, only at the module level, a combination of one of the partial module construction plans with the individualized partial module construction plan; and
    in the case of successful validation, composing the partial module construction plans of the combination validated in this manner, to obtain the construction plan.

2. The method of claim 1, wherein the at least one element is linked with a second element or with a characteristic at the module level of one of the partial module construction plans, the method further comprising:
    automatic and rule-based co-modifying the linked element or the module characteristic as soon as the modification step of the element has been completed.

3. The method of one of claim 1, further comprising:
    depending on a further user input, selectively setting whether validation is to take place also at the element level or also at one of a plurality of lower sub-element levels.

4. The method of claim 1, wherein the aircraft component is an aircraft cabin.

5. The method of claim 1, wherein the plurality of modules comprises a plurality of groups of passenger seat rows.

6. The method of claim 5, wherein the at least one element is an individual passenger seat.

7. The method of claim 1, wherein the plurality of modules comprises one or more of galley modules or toilet modules, emergency equipment, seats for flight attendants, and cabin interior lining that is configurable with or without baggage compartments.

8. A non-transitory medium on which a program element is stored, the program element when executed on a processor configured to control the processor so that a computer-assisted method is implementable on the processor for generating a construction plan for a modular aircraft component comprising a plurality of individual modules, on the basis of already validated partial module construction plans for the individual modules, wherein at least one element is assigned to a respective partial module construction plan, and in this manner a hierarchy is defined that comprises a higher, module level and a lower, element level, wherein the processor controlled in this manner then:
   re-utilizes at least one of the already validated partial module construction plans;
   depending on user input, re-specifies at the element level one of the at least one element in one of the partial module construction plans to obtain an individualized partial module construction plan;
   validates, only at the module level, a combination of one of the partial module construction plans with the individualized partial module construction plan; and
   in the case of successful validation, composes the partial module construction plans of the combination validated in this manner, to obtain the construction plan.

9. A non-transitory medium on which are stored:
   a plurality of already validated partial module construction plans for a plurality of individual modules of a modular aircraft component, wherein at least one element is assigned to a respective partial module construction plan, and as a result of this a hierarchy is defined that comprises a higher, module level and a lower, element level; and
   a plurality of instructions which when carried out by a processor are configured for implementing a computer-assisted method for generating a construction plan for the modular aircraft component on the processor, wherein the processor then:
   re-utilizes at least one of the already validated partial module construction plans;
   depending on user input, re-specifies at the element level one of the at least one element in one of the partial module construction plans to obtain an individualized partial module construction plan;
   validates, only at the module level, a combination of one of the partial module construction plans with the individualized partial module construction plan; and
   in the case of successful validation, composes the partial module construction plans of the combination validated in this manner, to obtain the construction plan.

10. A device for a computer-assisted generation of a construction plan for at least one modular aircraft component from a plurality of individual modules on the basis of already validated partial construction plans for the individual modules, wherein at least one element is assigned to a respective partial module construction plan, and in this manner a hierarchy is defined that comprises a higher, module level and a lower, element level, wherein the device comprises:
   a database on which the already validated partial module construction plans are stored as electronic data structures, wherein the data structures are configured for depicting the hierarchy comprising two or more levels;
   a user interface for recording a user input;
   a processor equipped to re-utilize at least one of the already validated partial module construction plans and, on the element level and dependent on the user input, to re-specify one of the at least one element in one of the partial module construction plans in order to obtain an individualized module;
   a rules database on which validation rules are stored; and
   a validation unit that is equipped and configured to, limited to the module level and on the basis of the validation rules, validate a combination of one or several of the partial module construction plans with the individualized module construction plan, so that after successful validation the processor operates to compose the partial module construction plans of the combination validated in this manner, to obtain the construction plan.

11. The device of claim 10, wherein the at least one element is linked with a further element or with a characteristic at the module level of one of the partial module construction plans, wherein the processor is configured in such a manner that the linked element or the module characteristic is automatically and in a rule-based manner co-modified as soon as modification of the element has taken place.

12. The device of one of claim 10, wherein the validation unit is configurable to selectively set whether validation is also to take place at the element level or also at one or more lower sub-element levels.

13. The device of claim 10, further comprising a control unit that is configured, on the basis of the generated construction plan, to control or administer a manufacturing plant for aircraft.

14. An industrial manufacturing plant for the assembly of an aircraft, the plant being controlled or administered by a device, said device configured for a computer-assisted generation of a construction plan for at least one modular aircraft component from a plurality of individual modules on the basis of already validated partial construction plans for the individual modules, wherein at least one element is assigned to a respective partial module construction plan, and in this manner a hierarchy is defined that comprises a higher, module level and a lower, element level, wherein the device comprises:
   a database on which the already validated partial module construction plans are stored as electronic data structures, wherein the data structures are configured for depicting the hierarchy comprising two or more levels;
   a user interface for recording a user input;
   a processor equipped to re-utilize at least one of the already validated partial module construction plans and, on the element level and dependent on the user input, to re-specify one of the at least one element in one of the partial module construction plans to obtain an individualized module;
   a rules database on which validation rules are stored; and
   a validation unit equipped and configured to, limited to the module level and on the basis of the validation rules, validate a combination of one or several of the partial module construction plans with the individualized module construction plan, so that after successful validation the processor operates to compose the partial module construction plans of the combination validated in this manner, to obtain the construction plan.

* * * * *